United States Patent
Gilmore et al.

(10) Patent No.: US 11,297,809 B1
(45) Date of Patent: Apr. 12, 2022

(54) AMMONIA CONTROL IN A RECIRCULATING AQUACULTURE SYSTEM

(71) Applicant: NaturalShrimp, Inc., Dallas, TX (US)

(72) Inventors: F. William Gilmore, Parker, CO (US); Thomas C. Untermeyer, San Antonio, TX (US)

(73) Assignee: NATURAL SHRIMP INC., Dallas, TX (US)

( * ) Notice: Subject to any disclaimer, the term of this patent is extended or adjusted under 35 U.S.C. 154(b) by 0 days.

(21) Appl. No.: 17/369,434

(22) Filed: Jul. 7, 2021

(51) Int. Cl.
*A01K 63/04* (2006.01)
*A01K 61/85* (2017.01)
(Continued)

(52) U.S. Cl.
CPC ............ *A01K 63/045* (2013.01); *A01K 61/13* (2017.01); *A01K 61/85* (2017.01); *A01K 63/042* (2013.01);
(Continued)

(58) Field of Classification Search
CPC .... A01K 63/045; A01K 63/065; A01K 61/85; A01K 63/042; A01K 63/047; A01K 61/13; A01K 63/04; A01K 61/80; A01K 29/005; A01K 61/00; A01K 61/10; A01K 61/60; A01K 63/00; A01K 63/003; A01K 63/006; A01K 63/06; C02F 9/00; C02F 2201/46145; C02F 2201/4616; C02F 1/463; C02F 2209/40; C02F 1/283; C02F 2103/20; C02F 2209/04; C02F 2209/14; C02F 2201/4614; C02F 2209/29; C02F 2209/003; C02F 2201/46135; C02F 1/004; C02F 2209/02; C02F 2209/22; C02F 2301/046; C02F 2209/001; C02F 1/008; C02F 2101/16; C02F 1/4674; C02F 1/46104; C02F 1/001; C02F 1/32; C02F 1/78; C02F 2209/11; C02F 2303/04; C02F 2303/185; C02F 1/461; C02F 1/4672; C02F 2201/4612; C02F 2201/463;
(Continued)

(56) References Cited

U.S. PATENT DOCUMENTS

| 10,163,199 | B2 | 12/2018 | Gilmore |
| 2004/0107914 | A1* | 6/2004 | Untermeyer ........... A01K 63/04 |
| | | | 119/215 |

(Continued)

*Primary Examiner* — Joseph W Drodge
(74) *Attorney, Agent, or Firm* — Kyle W. Rost

(57) ABSTRACT

Selected freshwater or saltwater aquaculture systems are processed for the automatic removal of waste, ammonia, and pathogens while controlling temperature, oxygen, and feed amounts for obtaining maximum growth and survival at maximum aquatic species densities. A core platform treatment technology removes ammonia by combining chlorine with the ammonia to form chloramines, which are removed by catalytic activated carbon at a downstream filter station. Processing also removes potential pathogens by sterilizing and electrifying the water. The technology utilizes ammonia, chlorine, oxidation-reduction potential (ORP), and flow sensors to electronically adjust the amount of chlorine needed to remove the existing ammonia. A control system utilizes temperature, dissolved oxygen, and image processing sensors to optimize heating, cooling, feeding, and aeration.

14 Claims, 1 Drawing Sheet

(51) Int. Cl.
- *A01K 63/06* (2006.01)
- *C02F 9/00* (2006.01)
- *C02F 1/00* (2006.01)
- *C02F 1/28* (2006.01)
- *C02F 1/46* (2006.01)
- *A01K 61/13* (2017.01)
- *C02F 101/16* (2006.01)
- *C02F 1/463* (2006.01)
- *C02F 1/467* (2006.01)
- *C02F 103/20* (2006.01)
- *C02F 1/461* (2006.01)

(52) U.S. Cl.
CPC .......... *A01K 63/047* (2013.01); *A01K 63/065* (2013.01); *C02F 9/00* (2013.01); *C02F 1/004* (2013.01); *C02F 1/008* (2013.01); *C02F 1/283* (2013.01); *C02F 1/463* (2013.01); *C02F 1/4674* (2013.01); *C02F 1/46104* (2013.01); *C02F 2101/16* (2013.01); *C02F 2103/20* (2013.01); *C02F 2201/4614* (2013.01); *C02F 2201/4616* (2013.01); *C02F 2201/46135* (2013.01); *C02F 2201/46145* (2013.01); *C02F 2209/001* (2013.01); *C02F 2209/003* (2013.01); *C02F 2209/02* (2013.01); *C02F 2209/04* (2013.01); *C02F 2209/14* (2013.01); *C02F 2209/22* (2013.01); *C02F 2209/29* (2013.01); *C02F 2209/40* (2013.01); *C02F 2301/046* (2013.01)

(58) Field of Classification Search
CPC . C02F 2201/4674; A01G 33/00; A01G 31/00; G06T 7/0002; Y02A 40/81; Y02P 60/60
See application file for complete search history.

(56) References Cited

U.S. PATENT DOCUMENTS

| | | | |
|---|---|---|---|
| 2006/0021942 A1* | 2/2006 | Bradley | B01D 21/0009 210/663 |
| 2011/0308938 A1* | 12/2011 | Gilmore | C02F 1/463 204/228.6 |
| 2013/0112601 A1* | 5/2013 | Silver | C02F 3/025 210/143 |
| 2016/0039687 A1* | 2/2016 | Berrak | C02F 1/46109 204/233 |
| 2017/0081219 A1* | 3/2017 | Taylor | C02F 1/46104 |
| 2017/0150701 A1* | 6/2017 | Gilmore | C02F 1/32 |
| 2017/0362103 A1* | 12/2017 | Jung | C02F 1/78 |

* cited by examiner

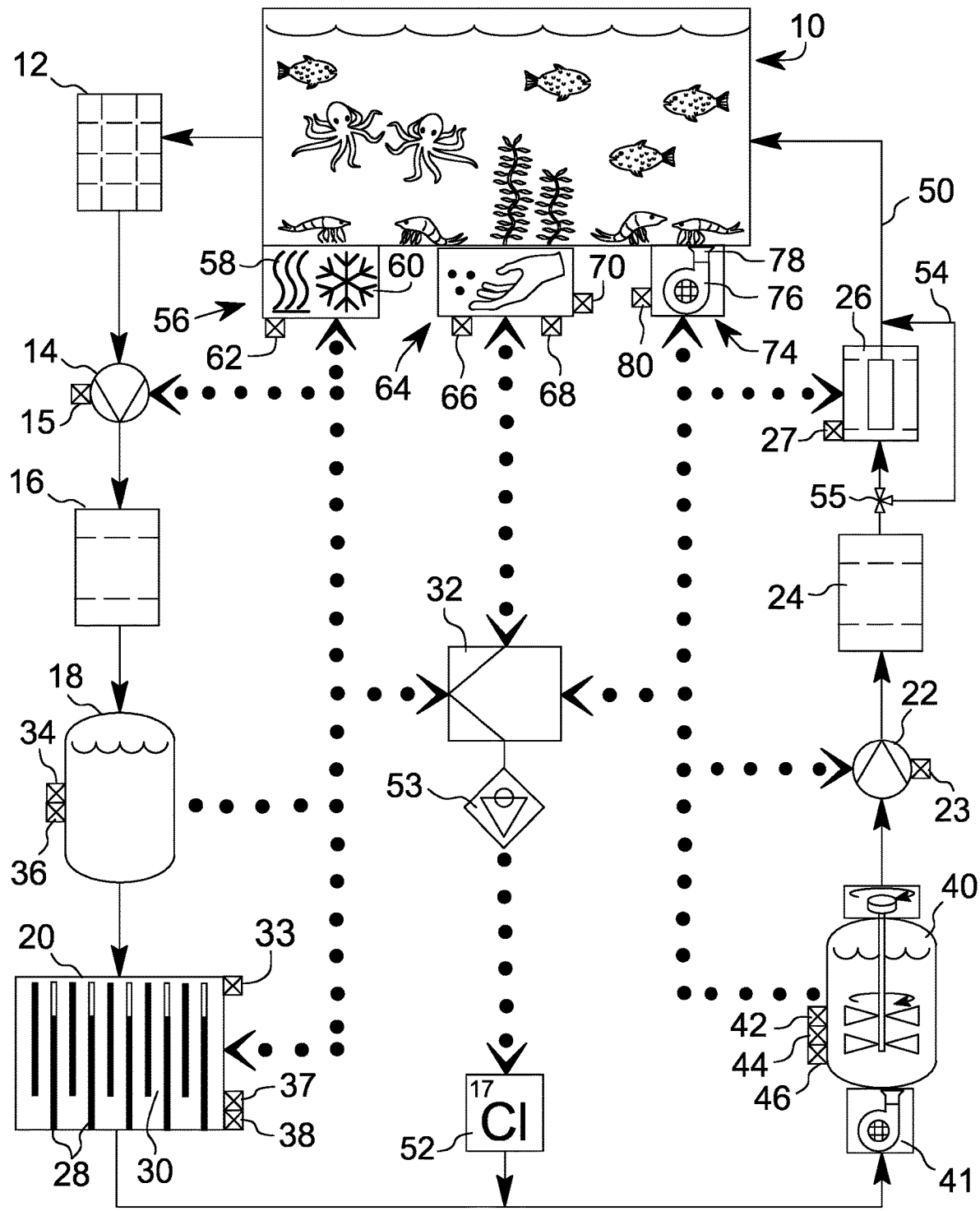

AMMONIA CONTROL IN A RECIRCULATING AQUACULTURE SYSTEM

BACKGROUND OF THE INVENTION

Field of the Invention

The invention generally relates to animal husbandry and more specifically to aquatic animal culturing. An aspect of the invention relates to crustacean culturing including the care and propagation of lobster, shrimp, or other aquatic arthropods that have a chitinous or calcareous exoskeleton. The invention may provide a habitat with recirculation and filter means. Another aspect of the invention relates to the care and propagation of fish. A further aspect of the invention relates to mollusk culturing, including the propagation and care of oyster, clam, or other aquatic animals with a soft, unsegmented body enclosed in a calcareous shell. The invention also relates to culturing aquatic plants. This invention is directed to the field of aquaculture for implementation of a different and unique system and method for treating aquatic species such as fish, crustaceans, mollusks, and aquatic plants. The system and method is known as a recirculating aquaculture system (RAS).

Description of Related Art

Aquaculture is the breeding, rearing, and harvesting of a captive aquatic species in various types of water environments. The captive aquatic species generate waste products that require removal during their growth process. Without removal, ammonia, bacteria, and solids quickly accumulate and overtake the system, significantly reducing survival of the aquatic species through harvest. The treatment method depends on the type of system deployed. Most aquaculture systems depend on an "open" flow method to remove the waste products by exchanging water between the aquaculture system and the surrounding environment. However, the "open" flow method can have a dramatically harmful effect on the local environment.

A small percentage of aquaculture systems utilize a "closed" flow method, also known as a recirculating aquaculture system or RAS, which recirculates the water within the system, thereby preventing contamination of the surrounding environment. However, this approach requires sophisticated treatment methods.

Traditional RAS do not discharge the wastewater into the environment and normally use a biofilter to remove the ammonia. A biofilter contains mainly two types of bacteria that can convert the ammonia under aerobic conditions first to nitrite (still toxic) and then to nitrate (not as toxic). A biofilter effectively removes the ammonia from the system but allows an increase in the nitrate levels. Therefore, typical RAS also utilize a de-nitrification process using another type of bacteria under anaerobic conditions to convert the excess nitrate to non-toxic nitrogen gas.

It would be desirable to control the excessive accumulation of waste, ammonia, and pathogens within the system without the going through the steps of first converting the ammonia to toxic nitrite, then converting the nitrite to somewhat toxic nitrate, and finally converting the nitrate to nitrogen gas.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide a recirculating aquaculture system that automatically controls solid waste, ammonia, pathogens, feed quantity, temperature, and oxygen.

Another object is to control the excessive accumulation of waste, ammonia, and pathogens within the system without the going through the steps of first converting the ammonia to toxic nitrite, then converting the nitrite to the still somewhat toxic nitrate, and finally converting the nitrate to nitrogen gas.

According to the invention, a closed recirculating aquaculture system treats an aqueous stream supporting a selected, contained aquatic species. The aquaculture system operates with a containment providing habitat for the selected aquatic species. A recirculating aquaculture system supports the selected species in an aquaculture containment having ammonia content. The water content is selected between fresh water or saltwater. A water processing column controls ammonia levels in the aquaculture containment by processing a stream of water from the containment. A solids filter is arranged in the said water processing column for receiving a water stream from the aquaculture containment and processing the water stream to mechanically remove solid waste. A first sampling locus is located in the water processing column downstream of the solids filter and has a sensor for detecting ammonia level in the water stream. An electrocoagulation chamber is positioned in the water processing column downstream from the first sampling locus and passes the water stream between electrically driven plates. When a saltwater system is selected, the electrocoagulation chamber generates chlorine. When a fresh water system is selected, the electrocoagulation chamber electrolyzes the water to subsequently receive chlorine. A second sampling locus is located in the water processing column downstream of the electrocoagulation chamber and has a sensor for detecting ammonia level in the water stream. A controller is connected to the first sampling locus and second sampling locus to receive readings of ammonia level. The controller is operable in response to the readings to control the electrocoagulation chamber. When a saltwater system is selected, the controller regulates plate voltage, current, and flow rate to combine ammonia with the generated chlorine to form a chloramine compound in the water stream. When a fresh water system is selected, the water processing column has a chlorine source positioned downstream from the electrocoagulation chamber, supplying chlorine to the electrolyzed water stream to combine with ammonia to form a chloramines compound in the water stream. A carbon filter is positioned in the water processing column downstream of the second sampling locus and removes chloramines from the water stream. A final portion of the water processing column returns the water stream from the carbon filter to the aquaculture containment.

The accompanying drawings, which are incorporated in and form a part of the specification, illustrate preferred embodiments of the present invention, and together with the description, serve to explain the principles of the invention. In the drawings:

BRIEF DESCRIPTION OF THE SEVERAL VIEWS OF THE DRAWINGS

FIG. 1 is a schematic representation of a closed recirculating aquaculture system.

DETAILED DESCRIPTION OF THE INVENTION

The invention is an apparatus and method for treating aquatic species in a recirculating aquaculture system by the method known as a RAS. Optimal growth, survival, and quality of an aquatic species mainly depends on regularly removing solid waste, toxic ammonia, and pathogens, providing the correct amount and type of feed, maintaining the ideal temperature, and supplying enough dissolved oxygen. A solids filter coupled with electrocoagulation, chlorine production, and carbon adsorption provides automatic removal of solid waste, toxic ammonia, and pathogens. Image processing coupled with ammonia sensing and temperature sensing provides automatic control of feeding. Temperature sensing provides automatic control of the water temperature. Dissolved oxygen sensors provide automatic control of the dissolved oxygen level to meet a minimum target level.

With reference to the drawings, an aquaculture containment or tank 10 illustrates a representative habitat for various selected aquatic species but is not a limitation as to the type of containment or the chosen species to be used for practice of the invention. Therefore, it will be understood that references to a tank 10 are for convenience of description, without excluding other types of containment. The illustrated living species in tank 10 are representative of possible choices of fish, mollusks, crustaceans, and plants. One of the species of greatest commercial value is shrimp. According to the needs of the chosen species, the habitat is adaptable to many different conditions including a choice of fresh water or saltwater. A plurality of tanks 10 may be serviced by a common group of water treating equipment.

Solid Waste, Ammonia, and Pathogen Removal System—According to the invention, water for the species in the tank 10 is treated to maintain quality. A treating water column processes the water, and a representative water column is shown to direct a water stream from one or more aquaculture containments 10 through a series of processing devices and steps, eventually returning the processed water stream to the aquaculture containments 10. The processing steps and devices may be varied according to whether the water in the aquaculture containments 10 is saltwater or fresh water. The processing devices and steps employed may vary according to availability of chemical reactions applicable to saltwater or fresh water. Chiefly, it is desirable to supply chlorine to the water stream to react with ammonia to form a chloramine compound, which can be removed from the water stream. With a saltwater stream, an electrocoagulation device processes the NaCl in the water to generate desired chlorine. With a fresh water stream, chlorine is added to the stream from a separate supply to react with ammonia and form a chloramine compound.

The water treatment column first employs an outlet screen 12 that separates exiting water in an individual tank 10 from the species in the tank. A first water pump 14 is located on the upstream side of an electrocoagulation chamber and supplies water at a pressure controlled by speed of the first pump to the process stream entering the water column. A first flow sensor 15 associated with the first pump monitors the water flow. Next in line, a solids filter 16 removes solid impurities such as wastes that have escaped from tank 10 through screen 12.

A collection tank 18 receives the water stream from one or more aquaculture containments 10, each having its own preliminary equipment from the screen 12 through the solids filter 16. The collection tank 18 is a first sampling locus in the water processing column between the solids filter 16 and an electrocoagulation chamber. The collection tank has an ammonia sensor detecting ammonia upstream of the electrocoagulation chamber 20 to read the ammonia level incoming to the electrocoagulation chamber. In the collection tank, the makeup of the water is evaluated by the associated ammonia sensor 34 and oxygen-reduction sensor 36. Readings of water makeup are communicated to a controller 32 that can adjust downstream processing according to the detected chemical content of the blended water stream in tank 18.

Next downstream from the collection tank 18 is the electrocoagulation chamber 20. Depending on whether the water stream is fresh water or saltwater, the electrocoagulation chamber may generate chlorine from saltwater to be followed by a chlorine feed 52, which may be a chlorine production system for treating fresh water. In either case, a mixing tank 40 is next in the treating column, providing a reaction zone and sensing chlorine, ammonia, and oxygen-reduction of the water. The mixing tank is a second sampling locus in the water processing column, located downstream of the electrocoagulation chamber 20. The ammonia sensor 42 is downstream from the electrocoagulation chamber and reads ammonia level on the outgoing side of the electrocoagulation chamber. Chloramine formation is supported in tank 40 by rotating blade mixers and an aerator 41.

A second water pump 22 follows the mixing tank and is associated with a second flow sensor 23, monitoring pressure in the water column downstream of the electrocoagulation chamber. The first and second flow sensors report flow readings to the controller 32 from the opposite sides of the electrocoagulation chamber 20.

Next in line, a mechanical pre-filter 24 catches solids. Then, a catalytically activated carbon filter 26, monitored by an associated chlorine sensor 27, effectively detects and removes chloramines, residual ammonia and other ammonia products from the treating column. The ammonia treatment and removal from the treating column eliminates the need for establishing a biofilter. Consequently, the treatment prevents the conversion of ammonia to nitrite and subsequently to nitrate. Therefore, thus approach eliminates the need for de-nitrification to remove excess nitrate from the system.

The feed eaten by the aquatic species within a RAS decomposes into a waste product referred to as solids. If solids are allowed to remain in the water column, they quickly foul the water by generating additional ammonia. The solid waste filter 16 mechanically removes solid waste from the water stream and is variable in its structure depending upon the aquatic species. With older technology, a typical RAS uses a variety of methods to remove solids such as settling basins, tube/plate separators, swirl separators, micro screen drum filters, granular media filters, cartridge filters, and foam fractionators.

The collection tank 18 is located in the water column between the solids filter 16 and the electrocoagulation chamber 20 and contains sensors to determine the chemical composition of the water stream. Applicable sensors include an ammonia sensor 34 that reads ammonia content; and an oxidation-reduction potential (ORP) sensor 36 that measures the oxidation-reduction potential of the stream in tank 18. The electronic controller 32 receives readings from the collection tank ammonia sensor 34 and collection tank ORP sensor 36 to regulate and control treatment applied by electrocoagulation.

The controller 32 monitors and regulates the operation of the water column. In the drawing, interactions between the controller 32 and other elements of the water column are shown by broken dotted lines and arrows showing directions of communications. It is shown that the controller 32 receives data from the heating and cooling system 58 for tank 10, from the auto feeder 64 serving tank 10, from aerator 74 serving tank 10, from both water pumps 14 and 26, and from the sensors associated with collection tank 18, electrocoagulation chamber 20, mixing tank 40, and carbon filter 26. The data sources are fed by readings taken by the sensors serving the named elements, such as flow sensors 15, 23, 38; ammonia sensors 34, 42, 70; ORP sensors 36, 46; temperature sensors 37, 62, 66; chlorine sensors 27, 44; image sensor (camera) 68; and oxygen sensor 80. The controller regulates operation of both pumps 14, 22; electrocoagulation chamber 20; the carbon filter 26; heating and cooling system 56; the auto feeder 64; and the aerator 74.

Depending upon whether the aquaculture tank is operating as a saltwater tank or a fresh water tank, the controller 32 regulates operation of chlorine supply 52 feeding chlorine to the water stream at the outlet of the electrocoagulation chamber 20. In a saltwater system, the chlorine supply 52 typically is not in operation because the electrocoagulation chamber generates chlorine from saltwater. A saltwater detector or switch 53 is shown between the controller 32 and the chlorine supply 52 to establish the option of shutting off the chlorine supply 52 to a saltwater stream.

The electrocoagulation system operates the reaction chamber 20, which typically contains both active and passive electrically driven plates 28. The electrocoagulation chamber 20 and its controller 32 include a power supply 33 for applying an electrical potential across the plates 28. The power supply can detect short circuits in the electrocoagulation chamber 20. The power supply 33 communicates with the controller 32 to shut down the electrocoagulation chamber if there is a short circuit. Temperature sensor 37 and flow sensor 38 monitor water conditions in the electrocoagulation chamber 20, including backpressure, and communicate their readings to the controller 32. The controller is operative to regulate electrocoagulation amperage in response to the communicated upstream oxidation-reduction readings and the incoming ammonia level readings, downstream chlorine readings, downstream oxidation-reduction readings, water flow readings at the pumps, water flow readings in the electrocoagulation chamber, and outgoing ammonia level readings. The controller is programmed with an acceptable range of water flow rates and water temperature and is operative to shut down the electrocoagulation chamber in response to readings outside the acceptable range of water flow rates and water temperature.

A selected backpressure is desirable to maintain satisfactory operation of the electrocoagulation chamber. Readings from the first and second flow sensors allow the controller to adjust backpressure in the electrocoagulation chamber by regulating relative pump speeds to maintain a selected backpressure.

The reaction chamber 20 can be configured to be self-cleaning and to operate in a non-pressured realm. The number of plates 28 and plate spacing 30 are variable, and the plates may be variably connected to operate as active or passive plates. For different applications, different water contents, or different aquatic species, the plate material may be chosen from among different plate materials, such as aluminum, carbon, iron, titanium, and metal oxide coated plates. The electrocoagulation process operates differently depending upon whether the water stream 50 is saltwater or fresh water. With saltwater, electrocoagulation electrolyzes the water to produce chlorine for treating ammonia, while with fresh water it does not. However, with fresh water, the water still becomes electrolyzed, which is associated with health benefits. The electrocoagulation temperature sensor 37 initiates an automatic shutdown of the electrocoagulation chamber in case of an unexpected elevated temperature.

The mixing tank 40 is equipped with an aerator 41 and is located in the water column between the electrocoagulation system 20 and the second water pump 22. The mixing tank 40 contains a mixing tank ammonia sensor 42, a mixing tank chlorine sensor 44, and a mixing tank ORP sensor 46. The controller 32 receives measurement data from the collection tank ammonia sensor 34 and ORP sensor 36, from the electrocoagulation flow sensor 38, and the mixing tank ammonia sensor 42, chlorine sensor 44, and mixing tank ORP sensors 46 to automatically adjust the electrocoagulation amperage to obtain optimum chlorine production based to process the ammonia.

The collection tank provides a sampling locus for taking sensor readings before the blended flow reaches the electrocoagulation chamber 20. The mixing tank 40 provides a sampling locus for taking sensor readings after the flow exits the electrocoagulation chamber 20. The controller 32 uses these before-and-after sensor readings to regulate the variable voltage and current in the electrocoagulation process. Similarly, the controller 32 varies pump operation to modify flow rate as ammonia level changes. Sensors and alarms can be applied to all parameters and to alert an operator to situations requiring attention.

In a saltwater stream 50 and with a proper voltage, current, and flow rate through the electrocoagulation chamber 20, interaction between the saltwater stream 50 and the plates 28 produces chlorine. The chlorine combines with the water to form hypochlorous acid according to Reaction 1, below. The hypochlorous acid then combines with available ammonia present in the water stream 50 to form chloramine compounds according to Reaction 2:

$$2Cl_2 + 2H_2O = 2HOCl + H_2 + Cl_2 \qquad \text{Reaction 1:}$$

$$NH_3 + HOCl = NH_2Cl + H_2O \qquad \text{Reaction 2:}$$

With a freshwater stream 50, chlorine is added to the recirculating stream 50 from a production or supply infeed 52 located between the electrocoagulation chamber 20 and the mixing tank 40. The quantity of chlorine added at infeed 52 is based on the amount of ammonia that the ammonia sensors have detected in the water stream, providing an appropriate quantity of chlorine to form available ammonia into chloramine.

The following table shows the relationship between ammonia, chlorine, oxidation-reduction potential (ORP), flow, voltage and amperage when adjusting the electrocoagulation voltage and current:

TABLE 1

Electrocoagulation Control

| Condition | Voltage | Amperage |
|---|---|---|
| Collection tank or mixing tank ammonia increases | Increase | Increase |
| Mixing tank chlorine increases | Decrease | Decrease |
| Mixing tank ORP/collection tank ORP ratio increases | Decrease | Decrease |
| Flow increases | Increase | Increase |

From the mixing tank 40, the stream 50 flows through a second pump 22 to help advance the stream through a final set of filters. A mechanical pre-filter 24 removes solids. The stream 50 advances to carbon filters 26 that remove residual chlorine. If the carbon filter chlorine sensors 27 detect chlorine sufficient to suggest a chlorine breakthrough, the sensors 27 cause the controller 32 to initiate an automatic shutdown of the electrocoagulation system and pumps 14, 22, to prevent delivery of chlorine into the aquaculture tank 10. After the carbon filters 26, the stream 50 returns to the aquaculture tank 10. The catalytic activated carbon filters 26 are located downstream from the electrocoagulation reaction chamber 20 so that during normal operations they adsorb the chloramine compounds and excess free chlorine from the water stream 50. Mechanical pre-filters 24 placed in-line before the activated carbon filters protect against solids entering the activated carbon filters. A related benefit of this method is the reduction of potentially harmful pathogens from the system because the electrocoagulation process reduces pathogens passing through.

The carbon filters 26 can be withdrawn from the water column to enable cleaning of aquaculture tanks 10 and other equipment in the water column between the electrocoagulation system 20 and the aqua culture tanks. A bypass line 54 provides an alternate path for the water column around the carbon filters 26. A 3-way valve 55 selects between the path through the carbon filters or the path around the carbon filters. The valve 55 can be opened to the alternative path either manually or automatically by controller 32. Use of the alternative path preserves chlorine content in the water so that the chlorine serves as part of a cleaning cycle. As a result of such a cut off, chlorine from whichever source is active, either the electrocoagulation system 20 or the separate chlorine production system 52, enters tanks 10 and participates in cleaning the tanks. The carbon filter is bypassed to allow chlorine sanitation of the aquaculture system prior to placement of the aquatic species.

Heating and Cooling System 56—Heaters 58 and chillers 60 employ a temperature sensor 62 communicating with the controller 32 to maintain the temperature of the aquatic species at a desired temperature for optimum growth and survival. Sensor 62 reads the temperature of the aquaculture containment and communicates the readings to the controller. Controller 32 is programmed with a desired temperature and appropriately diverts heated or cooled water through exchangers 58, 60, as appropriate within the aquaculture containment to maintain the desired temperature. Some species added to the aquaculture tank are sensitive to water temperature and to changes in temperature. The controller 32 is programmed to adjust the rate of water temperature change. An artificially slower or extended rate of temperature change can be selected to aid in acclimating a selected aquatic species to the aquaculture containment. The rate of change can be manually modified according to the needs of the added species. The extension might be by a multiple of normal operation, such as a doubling or tripling; of the extension might be by a selected time period, such as a term of hours or days.

Feed Dispenser 64—A feeding temperature sensor 66, a feeding ammonia sensor 70, and a feeding image processing sensor 68 provide data to the controller 32 to enable regulation of a feed dispenser 64. A proper amount of feed to be dispensed to each aquaculture tank 10 is based on ammonia level, temperature, and species population in the tank. The controller 32 determines the tank population from image sensor data and modifies the feeding amount and frequency as needed. Proper feeding of a RAS is essential for the water processing column to operate optimally. Underfeeding slows growth and encourages cannibalism. Overfeeding wastes feed and unnecessarily increases the ammonia, the pathogens, and the solids within a RAS. The amount and type of feed required for a RAS depends not only on the type of aquatic species in the aquaculture tank 10 but also their population and their average weight at the time of feeding. A typical RAS of earlier days would rely upon estimation of aquatic species population by using manual techniques such as feed trays or net captures and estimation of aquatic species average weight by manually taking weight samples.

This invention uses the automatic feed dispenser 64 to optimize water processing. The feed dispenser uses feeding system temperature sensors 66, ammonia sensors 70, and image sensors 68 or cameras with image processing software to determine the population within the aquaculture tank 10. Image processing software processes photos periodically taken within a known proportional volume of the tank and averages those results over time. The image processing software calculates the average weight of the aquatic species by determining individual weights based on their size. The controller 32 can derive sensor readings based on mechanical changes or color changes of devices that are sensitive to water condition variations from the image data. An example of a sensor reading based on color change is the water temperature of a tank detected by a Fluval Edge brand aquarium thermometer, a product of Rolf C. Hagan, Inc., of Mansfield, Mass. 002048. This thermometer demarks each two degree temperature by a separately brightened colored band. Another example of a sensor reading based on color change is the ammonia content of an aquarium detected by an Ammonia Alert brand detector, a product of Seachem Laboratories, Inc., or Madison, Ga. 30650. This detector demarks a selected reading around a dial by separately brightened color sectors. These and other sensor readings are detectable by camera pictures and software interpretation. A programmed controller 32 receives the pictures, interprets data from the readings, and automatically controls water conditions in the tank 10, such a feed adjustment, water temperature, oxygen level, ammonia removal, and pH.

The feeding temperature sensor, feeding ammonia level sensor, and feeding image sensor communicate the feeding water temperature, feeding ammonia level, and population of the selected species to the controller. The controller 32 uses the population and average weight along with temperature and ammonia data to determine and set the proper feed amounts and frequency for the automated feeding system to support safe and optimal growth.

Aerator 74—The aquaculture tank has a target oxygen level for supporting safe and optimal growth of the selected species in the tank. The aeration oxygen sensor 80 reads oxygen content of water in the aquaculture tank 10 and provides a feedback of oxygen level readings to the controller 32. The controller is programmed to maintain the target oxygen level in the tank at the target value and automatically adjusts air flow delivered to the aquaculture tank 10. Blowers 76 input air or oxygen to the water in tank 10. A diffuser 78 spreads the input for broad absorption in the tank water. The controller 32 uses aeration oxygen sensors 80 to read the level of dissolved oxygen in the aquaculture tank 10 and adjusts the amount of delivered oxygen or air to keep the oxygen at the desired level.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. In a recirculating aquaculture system supporting a selected species placed in an aquaculture containment and therein producing ammonia and generating potential pathogens, a water processing system receiving a water stream from said aquaculture containment, processing said water stream to control said ammonia and said potential pathogens, and returning a water stream to the aquaculture containment, comprising:
    a solids filter arranged in said water processing system downstream from the aquaculture containment for receiving the water stream and processing the water stream to mechanically remove solid waste;
    an electrocoagulation chamber positioned in the water processing system downstream from said solids filter, said electrocoagulation chamber containing therein spaced electrically driven adjacent plates operating with an electrical potential between said adjacent plates, receiving the water stream between the plates, wherein the plates are operative to electrolyze the water stream thereby removing the potential pathogens and operable to process saltwater to generate chlorine gas in the water stream;
    a first sampling locus in the water processing system, receiving and sampling water from the water stream at a position between the solids filter and the electrocoagulation chamber, said first sampling locus comprising an upstream ammonia sensor measuring upstream ammonia level in the water stream incoming to the electrocoagulation chamber;
    a second sampling locus in the water processing system, receiving and sampling water from the water stream at a position downstream of the electrocoagulation chamber, said second sampling locus comprising a downstream ammonia sensor measuring ammonia level in the water stream downstream of the electrocoagulation chamber;
    a controller connected to said upstream and downstream ammonia sensors to receive said measurements of ammonia level incoming to and outgoing from the electrocoagulation chamber;
    wherein said controller is operable in response to said ammonia level measurements to control the electrocoagulation chamber by regulating said electrical potential between the plates to be operable on saltwater to combine ammonia with said generated chlorine to form a chloramine compound in the water stream; and
    a carbon filter positioned in the water processing system downstream of said second sampling locus, operable to remove chloramine compound from the water stream passing through said carbon filter; and
    wherein the carbon filter provides the returning water stream for returning from the carbon filter to the aquaculture containment.

2. The recirculating aquaculture system of claim 1, further comprising:
    a chlorine source is positioned in said water processing system downstream from said electrocoagulation chamber, operative for supplying chlorine to said water stream to combine with ammonia to form a chloramine compound in the water stream.

3. The recirculating aquaculture system of claim 1, further comprising:
    at said first sampling locus, an upstream oxidation-reduction sensor measuring oxidation-reduction level in said water stream, upstream of said electrocoagulation chamber;
    wherein said upstream oxidation-reduction sensor communicates said upstream oxidation-reduction measurement to said controller;
    at said second sampling locus, a downstream chlorine sensor measuring chlorine level in the water stream and a downstream oxidation-reduction sensor measuring oxidation-reduction level in the water stream;
    wherein said downstream chlorine sensor and said downstream oxidation-reduction sensor communicate said downstream chlorine measurement and said downstream oxidation-reduction measurement to the controller;
    a first water flow sensor measuring water flow upstream of the electrocoagulation chamber;
    wherein said first water flow sensor communicates said upstream water flow measurement to the controller;
    a second water flow sensor measuring water flow downstream of the electrocoagulation chamber;
    wherein said second water flow sensor communicates said downstream water flow measurement to the controller; and
    a third water flow sensor measuring water flow at the electrocoagulation chamber;
    wherein said third water flow sensor communicates said water flow measurement at the electrocoagulation chamber to the controller; and
    the controller is operative to regulate said electrical potential between said adjacent plates in response to the communicated upstream oxidation-reduction measurement, said incoming ammonia level measurement, the communicated downstream chlorine measurement, the communicated downstream oxidation-reduction measurement, the communicated upstream water flow measurement, the communicated downstream water flow measurement, the communicated electrocoagulation chamber water flow measurement, and said outgoing ammonia level measurement.

4. The recirculating aquaculture system of claim 1, further comprising:
    a power supply communicating with said controller and with said electrocoagulation chamber, operative during operation of the electrocoagulation chamber for applying said electrical potential between said adjacent plates in the electrocoagulation chamber and during q short circuit condition, within the electrocoagulation chamber, detecting the short circuit condition;
    wherein said power supply communicates said detected short circuit condition to the controller, and the controller is operable in response to receiving said communication of short circuit condition to shut down the power supply.

5. The recirculating aquaculture system of claim 1, further comprising:
a water flow sensor measuring water flow rate in said electrocoagulation chamber and communicating said water flow measurement to said controller;
wherein, the controller is programmable for a set range of water flow rates in the electrocoagulation chamber, and is operative to shut down said electrocoagulation chamber in response to a measurement outside said set range of water flow rates.

6. The recirculating aquaculture system of claim 1, further comprising:
a water temperature sensor measuring the water temperature in said electrocoagulation chamber and communicating said water temperature measurement to said controller;
wherein, the controller is programmable for a set range of water temperatures in the electrocoagulation chamber, and is operative to shut down said electrocoagulation chamber in response to a measurement outside said set range of water temperatures.

7. The recirculating aquaculture system of claim 1, wherein said aquaculture containment further comprises:
a feed dispenser;
a feeding temperature sensor measuring water temperature, a feeding ammonia level sensor measuring ammonia content of said water, and a feeding image sensor reading data indicating population of said selected species;
wherein said feeding temperature sensor, feeding ammonia level sensor, and feeding image sensor communicate said feeding water temperature measurement, feeding ammonia level measurement, and data indicating population of the selected species to said controller; and
the controller is programmable to process the feeding water temperature measurement, the feeding ammonia level measurement, and the data indicating population of the selected species to select an amount of feed to dispense and to select a frequency for dispensing said amount of feed and to operate said dispenser in accordance with said selected amount and frequency of feed to dispense.

8. The recirculating aquaculture system of claim 7, wherein:
said controller derives species population and weight from said image data.

9. The recirculating aquaculture system of claim 8, wherein:
said feeding temperature sensor displays measured temperature by displaying a color corresponding to said measured temperature;
said feeding image sensor inputs said color as image data and transmits said image data to said controller; and
the controller processes the image data based on the color of the feeding temperature sensor.

10. The recirculating aquaculture system of claim 1, where said electrocoagulation chamber is operable at a selected backpressure, further comprising:
a first water pump having a first associated flow sensor measuring a first water flow at said first pump, located in said water processing system on the upstream side of said electrocoagulation chamber and communicating said first water flow measurement to said controller; and
a second water pump having a second associated flow sensor measuring a second water flow at said second pump, located in the water processing system on the downstream side of the electrocoagulation chamber and communicating said second water flow measurement to the controller;
wherein, the controller is operational to determine a measured backpressure in the electrocoagulation chamber from the first water flow measurement and second water flow measurement and to adjust relative speeds of the first and second water pumps to automatically maintain said selected back pressure in the electrocoagulation chamber.

11. The recirculating aquaculture system of claim 1, further comprising:
a heating/cooling temperature sensor measuring the water temperature within said aquaculture containment and communicating said measurement to said controller;
a heater selectively operational to deliver heated water into the aquaculture containment; and
a cooler selectively operational to deliver cooled water into the aquaculture containment; and
wherein, the controller is programmed with a set water temperature for the aquaculture containment and is operative in response to said measurement from said heating/cooling temperature sensor to selectively operate one of said heater and said cooler to adjust water temperature in the aquaculture containment to said set water temperature; and
wherein, the controller is programmed to adjust the water temperature in the aquaculture containment over a variably selectable time period to allow temperature acclimation by a selected aquatic species in the aquaculture containment.

12. The recirculating aquaculture system of claim 1, further comprising:
an aerator having an oxygen sensor measuring oxygen level in said aquaculture containment and communicating said measurement to said controller;
a blower selectively operational to supply an input of oxygen to said aquaculture containment; and
a diffuser operational to spread said input of oxygen over a broad area of the aquaculture containment;
wherein the controller is programmed with a target oxygen level to support safe and optimal growth of said selected species in the aquaculture containment; and
the controller is operative in response to said measurement from said oxygen sensor, if below said target oxygen level, to selectively operate said blower to deliver an input of oxygen until the target oxygen level is reached.

13. The recirculating aquaculture system of claim 1, further comprising:
a bypass line operative for bypassing said carbon filter and flowing the returning water stream from upstream to downstream ends thereof; and
a valve selectively operated to route said water stream either through the carbon filter or through said bypass line, the bypass line operative for flowing the returning water stream through the bypass line for return to the aquaculture containment and passing chlorine for chlorine sanitation of said aquaculture system prior to placement of said aquatic species in the aquaculture containment.

14. In a recirculating aquaculture system supporting a selected species placed in an aquaculture containment and therein producing ammonia and generating pathogens, a water processing system receiving a water stream from said aquaculture containment, processing said water stream to control levels of said ammonia and said pathogens, and returning a processed water stream to the aquaculture containment, comprising:

an electrocoagulation chamber positioned in the water processing system downstream from the from the aquaculture containment, having an incoming end receiving the water stream and an outgoing end discharging the water stream, said electrocoagulation chamber containing therein, between said incoming and outgoing ends, spaced electrically driven adjacent plates operating with an electrical potential between said adjacent plates, receiving the water stream between the plates, wherein the plates are operative to electrolyze the water stream thereby removing potential pathogens and operative to process saltwater to generate chlorine gas in the water stream;

a first sampling locus in the water processing system, receiving and sampling water from the water stream at a position between the aquaculture containment and said incoming end of the electrocoagulation chamber, said first sampling locus comprising an upstream ammonia sensor measuring ammonia level in the water stream upstream of the electrocoagulation chamber;

a second sampling locus in the water processing system, receiving and sampling water from the water stream at a position downstream of the electrocoagulation chamber, said second sampling locus comprising a downstream ammonia sensor measuring ammonia level in the water stream downstream of the electrocoagulation chamber;

a controller connected to said upstream and said downstream ammonia sensors to receive said measurements of ammonia level upstream to and downstream from the electrocoagulation chamber;

wherein said controller is operable in response to said ammonia level measurements to control the electrocoagulation chamber by regulating said electrical potential between the adjacent plates to be operative on saltwater to combine ammonia with said generated chlorine gas to form a chloramine compound in the water stream; and a filter positioned in the water processing system downstream of said second sampling locus, operable to remove said chloramine compound from the water stream passing through said filter; and wherein the filter provides the processed water stream for returning from the filter to the aquaculture containment.

* * * * *